United States Patent [19]

Kogure

[11] Patent Number: 5,081,882

[45] Date of Patent: Jan. 21, 1992

[54] DAMPER DEVICE FOR A MOTOR

[75] Inventor: Toshiharu Kogure, Narashino, Japan

[73] Assignee: Seiko Seiki Kabushiki Kaisha, Japan

[21] Appl. No.: 569,374

[22] Filed: Aug. 13, 1990

Related U.S. Application Data

[63] Continuation of Ser. No. 234,816, Aug. 22, 1988, abandoned.

[30] Foreign Application Priority Data

Sep. 4, 1987 [JP] Japan .................... 62-135671[U]

[51] Int. Cl.$^5$ ................................ F16F 1/10
[52] U.S. Cl. ........................... 74/574; 188/290
[58] Field of Search ............. 74/574, 573 F; 188/290, 188/293, 267, 288, 322.16, 80; 277/80

[56] References Cited

U.S. PATENT DOCUMENTS

| | | | |
|---|---|---|---|
| 3,861,503 | 1/1975 | Nash | 188/290 |
| 4,049,985 | 9/1977 | Sudler | 188/267 |
| 4,200,003 | 4/1980 | Miller | 74/574 |
| 4,526,381 | 7/1985 | Ezekiel | 277/80 |
| 4,844,220 | 7/1989 | Maji | 188/268 |

FOREIGN PATENT DOCUMENTS 1956759 5/1971 Fed. Rep. of Germany ........ 277/80

62-31776 2/1987 Japan ......................... 277/80

Primary Examiner—Gary L. Smith
Assistant Examiner—Flemming Saether
Attorney, Agent, or Firm—Bruce L. Adams; Van C. Wilks

[57] ABSTRACT

A damper device for a motor having a boss section attached to a rotary shaft of the motor, a mass inertia section rotatably supported by the boss section such that it surrounds the outer periphery of the boss section with a gap left therebetween, a magnetic fluid filling up the gap, and magnets provided in either the boss section or the mass inertia section for preventing leakage of the magnetic fluid. Furthermore, the boss section and the mass section facing each other through the gap are made of materials differing in the coefficient of thermal expansion, even if the magnetic fluid is heated by heating of the motor, an external temperature variation and the like so that its viscosity is decreased, such a decrease in viscosity can be canceled out by a change in gap dimension caused by the difference in expansion between the boss section material and the mass section material differing in the coefficient of thermal expansion. Therefore, the damping effect is kept constant without being influenced by thermal fluctuations.

16 Claims, 4 Drawing Sheets

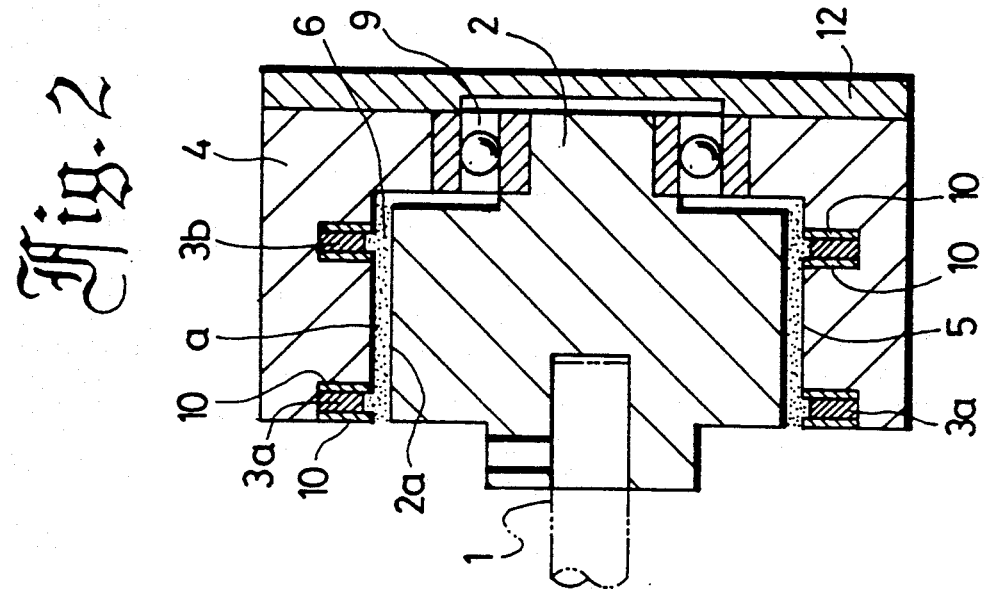
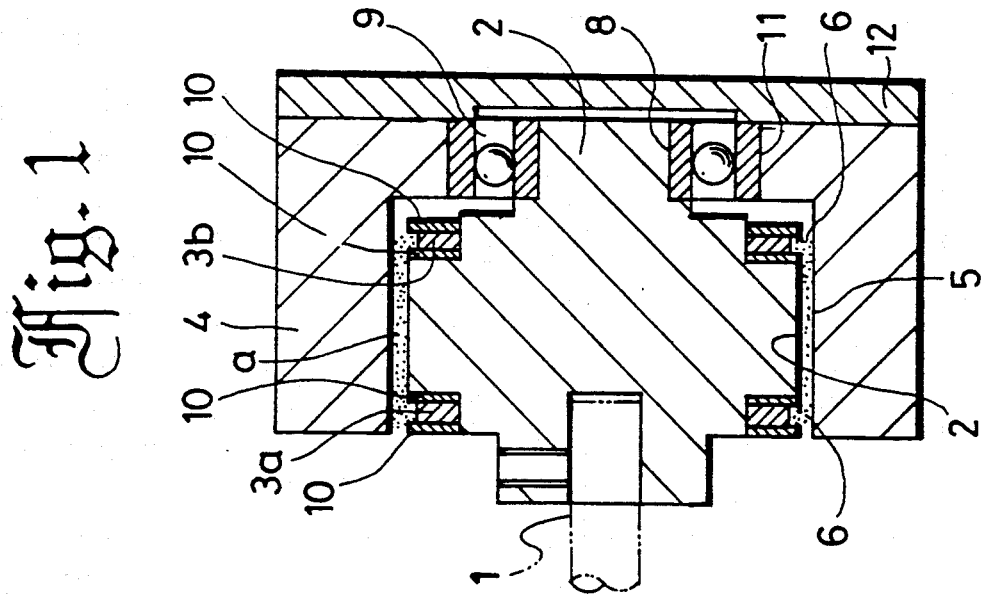

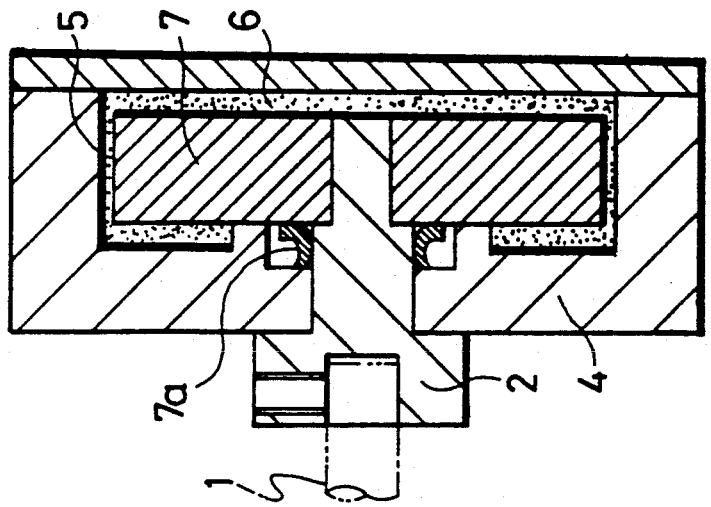
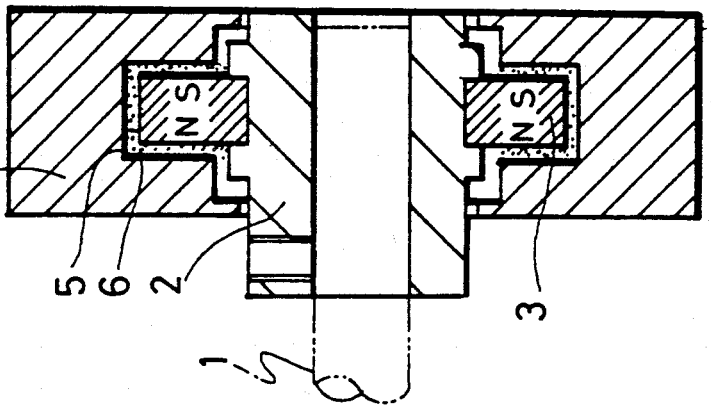
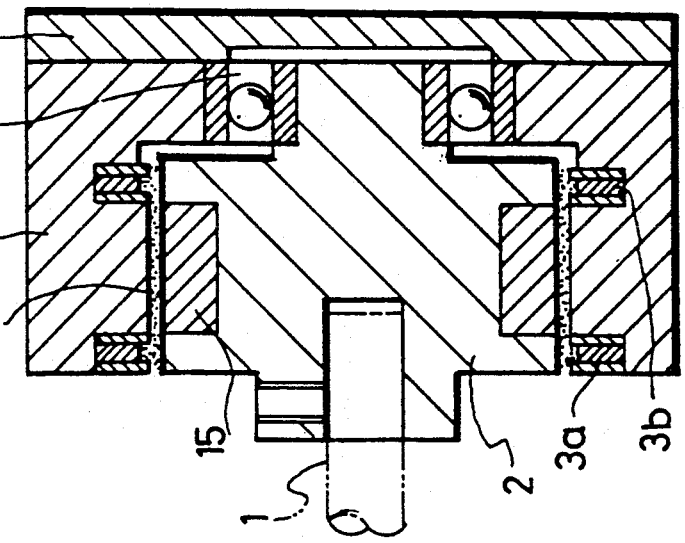

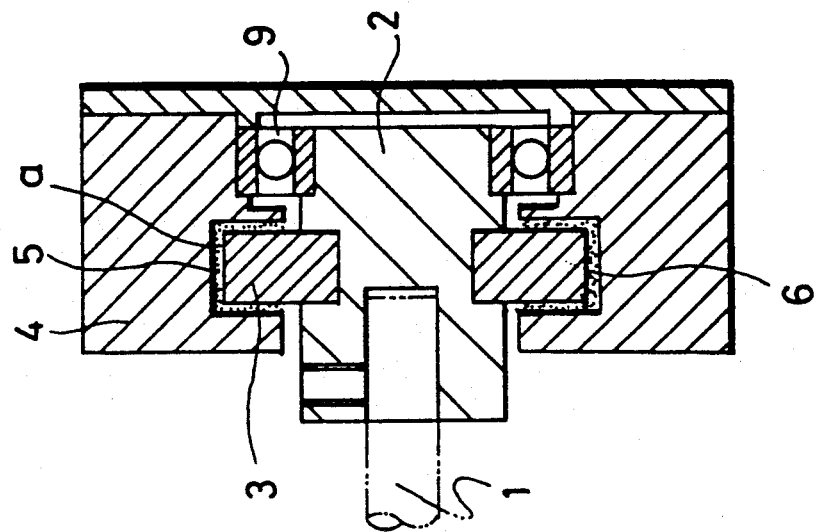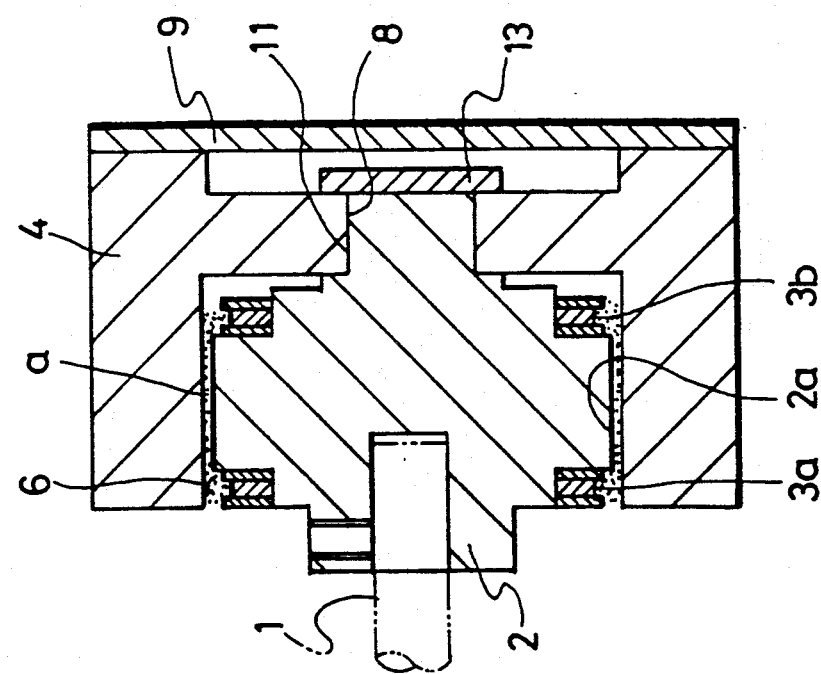

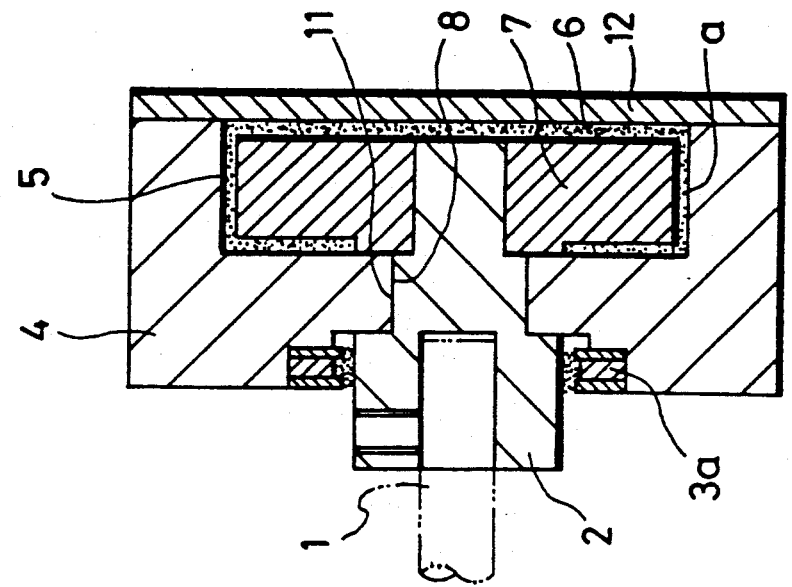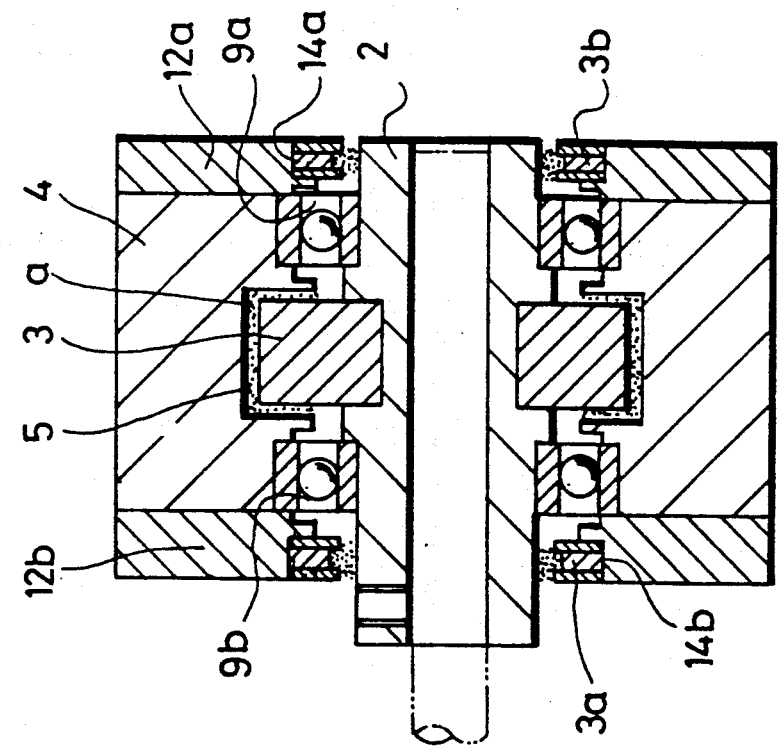

DAMPER DEVICE FOR A MOTOR

This is a Rule 62 continuation application of parent application Ser. No. 234,816 filed Aug. 22, 1988, now abandoned.

BACKGROUND OF THE INVENTION

This invention relates to a damper device for a motor and, more particularly, to a damper device adapted for use with a stepping motor.

When the stepping motor used in a control apparatus is rotationally stopped, it comes to a full stop after damping oscillations about a desired stop position. Therefore, to quickly stop the motor at a given position, a means for absorbing such oscillatory energy is required. One type of absorbing means is a damper device attached to a rotary shaft of the motor.

A conventional damper device is configured as shown in FIG. 8, that is, a magnet 3 made of a ring-shaped permanent magnet is provided on the outer periphery of a boss section 2 secured to a rotary shaft 1 of a motor, and the magnet 3 is engaged with a mass inertia section 4 (hereinafter referred to as "a mass section") and extends into concave portion 5 formed in the inner peripheral wall of the mass section 4 via a magnetic fluid 6.

The foregoing damper device utilizing the magnetic fluid needs no seal means for preventing leakage of the magnetic fluid, and thus has the advantage that the damping effect is not degraded because the frictional resistance of a seal is not present.

Another conventional damper device is configured as shown in FIG. 9, in which the mass section 4 is mechanically supported rotatably on to the boss section 2.

That is, in this damper device, a rotary wheel 7 is secured to the end of a boss section 2 which is in turn secured to a rotary shaft 1 of a motor, the rotary wheel 7 is engaged with a concave portion 5 of a mass section 4 via a viscous fluid 6, and the mass section 4 is supported rotatably by the boss section 2. In this mechanically-supported type damper device, a V-ring-like seal means 7a for preventing leakage of the viscous fluid 6 is provided on the boss section 2.

This damper device of the mechanically-supported type has the advantage that the gap formed between the outer diameter of the rotary wheel 7 and the inner wall of the concave portion 5 of the mass section 4 can be made fixed, and that the structure is simplified.

However, among the foregoing conventional damper devices; the first magnetic fluid type has the disadvantage that the gap cannot be made fixed unless the magnetic fluid is high in viscosity because the magnetic fluid acting as the viscous fluid serves also as the bearing means of the mass section, and there is the drawback that the damping effect cannot be uniformly exerted because the viscosity of the fluid tends to decrease due to external heating especially if the fluid possesses a high viscosity.

Further, if the load inertial or the rotor inertial of the motor varies, it is necessary to vary the inertia of the mass section or the viscosity of the magnetic fluid correspondingly.

That is, since the same gap not only functions as the bearing of the mass section but also causes the generation of the damping action, a variation in the weight of the mass inertia section results in an offset in the gap dimension (a narrow spacing and a wide spacing); thus, there is the drawback that the damping effect is not exerted uniformly. If a magnetic fluid of high viscosity is employed to make the gap uniform, the problem occurs that the damping effect is degraded by the influence of a variation in external temperature, as described above.

Further, since the viscosity of the magnetic fluid has some limits and therefore the gap being filled with the magnetic fluid must be made narrow, the accuracy of machining must be enhanced, thus increasing the cost.

On the other hand, the second damper device of the type in which the mass section is mechanically supported includes the seal means in the shaft section; thus, there is the disadvantage that due to the frictional resistance of the seal means, residual oscillations appear to degrade the damping effect, and there is the drawback that the actual stop position of the motor deviates from a target point due to the frictional resistance of the seal means.

SUMMARY OF THE INVENTION

It is an object of the present invention to provide a damper device for a motor which is able to exert a damping effect uniformly without any residual oscillations.

It is a further object of the invention to provide a damper device for a motor by which the damping effect is kept constant irrespective of an increase/decrease of the viscosity of the magnetic fluid owing to the temperature variation.

These and other objects are attained in accordance with one aspect of the invention comprising a boss section attached to a rotary shaft of the motor, a mass inertia section rotatably supported by the boss section such that it surrounds the outer periphery of the boss section with a gap left therebetween, a magnetic fluid filling up the gap, and magnets provided in either the boss section or the mass inertia section for preventing leakage of the magnetic fluid.

In accordance with another aspect of the invention, the boss section and the mass section, which face each other through the gap are made of materials having a different coefficient of thermal expansion, so that even if the magnetic fluid is heated by heating of the motor, by external temperature variations and the like so that its viscosity is decreased, such a decrease in viscosity can be canceled out by a change in gap dimension caused by the difference in expansion between the boss section material and the mass section material which have different coefficient of thermal expansion. Therefore, the damping effect is kept constant without being influenced by thermal fluctuations.

BRIEF DESCRIPTION OF THE DRAWINGS

A full understanding of the present invention will be obtained from the detailed description of the preferred embodiments presented hereinbelow, and the accompanying drawings, which are given by way of illustration only and are not intended to be limitative of the present invention, and wherein:

FIGS. 1 through 7 are vertical sectional views showing first through seventh embodiments of a damper device for motors according to the present invention, and FIGS. 8 and 9 are conventional damper devices in which FIG. 8 is a vertical sectional view of a magnetic fluid type damper device and FIG. 9 is a vertical sectional view of a mechanically-supported type damper device.

DETAILED DESCRIPTION OF THE PREFERRED EMBODIMENTS

The present invention will now be described with reference to embodiments shown in the drawings in which components similar to those of the conventional devices are designated by the same reference numerals as used in describing the prior art (FIGS. 8 and 9).

FIG. 1 is a vertical sectional view of a damper device according to the present invention, in which numeral 1 is a rotary shaft of a motor, and a boss section 2 is secured to the end of the rotary shaft by a fixing screw (not shown).

The side of the boss section 2 opposite to its side secured to the rotary shaft 1 is made small in diameter to define a bearing portion 8, and a roller bearing, such a ball bearing 9, is supported by this bearing portion 8. Numerals 3a and 3b are magnets made of ring-shaped permanent magnets which are provided at either side of a large-diameter portion 2a of the boss section 2, and mounting rings 10 are provided on either side of each magnet. By such an arrangement, the magnets 3a, 3b are separated by the large-diameter boss portion 2a which extends radially beyond the magnets to define a radially offset area.

In the drawing, numeral 4 is a mass section having a concave portion 5 whose inner diameter is a little larger than the large-diameter portion 2a of the boss section 2, this concave portion 5 surrounding and encircling the periphery of the large-diameter portion 2a with a certain gap a left therebetween. States otherwise, the outer peripheral surface portion of the boss section 2 is spaced from and faces the inner peripheral surface portion of the mass section 4 to define therebetween the annular gap a. The mass section 4 has a bearing portion 11 formed on one side thereof whose inner diameter corresponds to the outer diameter of the ball bearing 9. Accordingly, the mass section 4 is rotatably and mechanically supported via the ball bearing 9 by the boss section 2.

In the drawing, numeral 6 is a magnetic fluid acting as a viscous fluid, which fills up the annular gap a formed between the outer diameter of the large-diameter portion 2a of the boss section 2 and the inner diameter of the concave portion 5 of the mass section 4.

Numeral 12 is a cover which is provided so as to cover one side surface of the mass section 4 and to retain in place the ball bearing 9, the cover being screwed to the mass section 4.

In the foregoing configuration, when the boss section 2 is rotated by the rotary shaft 1, the mass section 4 does not rotate integrally together with the boss section 2 because it is supported via the ball bearing 9 by the boss section 2, but is rotatingly dragged by means of the viscous resistance of the magnetic fluid 6 in the gap a.

In addition, since the mass section 4 is supported via the ball bearing 9 by the boss section 2, the annular gap a is kept fixed and the opposed, facing surface portions of the boss section 2 and the mass section 4 are maintained equidistantly spaced apart to maintain the gap spacing generally uniform, and since the magnetic fluid 6 in the gap a is confined therein and held by the magnets 3a and 3b, it cannot leak out from the gap a.

Moreover, because there is no contact-type seal means as shown in FIG. 9, the damping effect is uniformly exerted without any residual oscillations.

FIG. 2 is a vertical sectional view showing a second embodiment of the present invention, which differs from the first embodiment only in the mounting position of the magnets 3a and 3b.

That is, in contrast with the first embodiment wherein the magnets 3a and 3b are provided in the boss section 2, these magnets are provided in the inner periphery of the concave portion 5 of the mass section 4. The magnets 3a, 3b are separated by a part of the mass section 4 which extends radially beyond the magnets to define a radially offset area.

With the foregoing configuration, also, the leakage of the magnetic fluid 6 in the gap a can be prevented, hence, the same function and effect as those of the first embodiment can be obtained.

FIG. 3 shows a third embodiment of the present invention which differs from the first embodiment only in the structure of supporting the mass section.

That is, in contrast with the first embodiment (FIG. 1) wherein the boss section 2 and the mass section 4 are coupled together via the ball bearing 9, in this embodiment the bearing portion 11 of the mass section 4 is held in direct sliding contact with and directly supported by the bearing portion 8 of the boss section 2.

In the drawing, numeral 13 is a holding member provided at one end of the boss section 2, which maintains the mass section 4 on the bearing portion 8.

According to this embodiment, the gap a is kept fixed, hence, the same function and effect as those of the first embodiment can be obtained and the cost can be lowered due to the omission of the ball bearing.

FIG. 4 shows a fourth embodiment of the present invention, in which a magnet 3 having a diameter and a width substantially identical with those of the large-diameter portion 2a of the boss section 2 of the foregoing embodiments (FIGS. 1 through 3) is provided in a substantially central portion of the boss section 2, and the concave portion 5 of the mass section 4 is configured so as to match with and conform to the outer diameter of the magnet 3.

The manner of supporting the mass section is identical with that of the first or second embodiment.

In the foregoing configuration, the gap a is formed between the outer diameter and side walls of the magnet 3 and the inner peripheral wall of the concave portion 5 of the mass section 4.

Therefore, the magnetic fluid 6 filling up the gap a is held by the magnet 3, and the gap a is kept fixed by the ball bearing 9.

That is, in this embodiment, the magnet 3 is widened so as to serve as a combination of the large-diameter portion 2a of the boss section 2 and the magnets 3a and 3b shown in FIGS. 1 through 3.

Accordingly, in the present invention, the gap defined as formed between the boss section and the mass section should be understood to include the gap of the combined configuration.

FIG. 5 shows a fifth embodiment of the present invention, in which ball bearings 9a and 9b similar to the ball bearing 9 of the fourth embodiment (FIG. 4) are provided on either side of the magnet 3, and the magnets 3a and 3b are additionally provided in covers 12a and 12b which hold the ball bearings 9a and 9b.

To mount the magnets 3a and 3b to the covers 12a and 12b, stepped holes 14a and 14b a little larger than the outer diameter of the boss section 2 are formed in the covers 12a and 12b, in which holes the magnets 3a and 3b are fitted.

In this embodiment, since the mass section 4 is supported via the two ball bearing 9a and 9b by the boss section 2, the gap a is stably provided, hence, the damping effect is uniformly exerted.

FIG. 6 shows a sixth embodiment of the present invention, in which the boss section 2 has the bearing portion 8 formed in a central portion thereof and correspondingly, the mass section 4 has the bearing portion 11 formed in a central portion thereof. A rotary wheel 7 is secured to the end of the boss section 2 so that the outer diameter of the rotary wheel 7 is accommodated in the concave portion 5 of the mass section 4 with the gap a left therebetween. The inside of the concave portion 5 is filled with the magnetic fluid 6, and an opening portion of the concave portion 5 is covered tightly with the cover 12.

The magnet 3a is provided on one side of the mass section 4 in accordance with the manner of mounting of the second embodiment (FIG. 2).

In the damper device of the above mentioned configuration, since the mass section 4 is supported by the boss section 2 the gap a is kept fixed, and since the leakage of the magnetic fluid 6 is prevented by the magnet 3a and the cover 12 the damping effect is stably exerted.

Although the rotary wheel 7 of this embodiment is provided independent of the boss section 2, these components may be made integral.

Accordingly, in the present invention, the gap defined as formed between the boss section and the mass section should be understood to imply the gap formed between the rotary wheel and the mass section.

FIG. 7 shows a seventh embodiment of the present invention, which is identical with the second embodiment (FIG. 2) except that the boss section 2 includes a thermal expansion portion 15, made of a material have a larger coefficient of thermal expansion than the other portions, located in a portion exposed to the gap a.

In this way, where a portion of the gap a is surrounded by the thermal expansion portion 15, if heat from the motor or from the outside is applied, the viscosity of the magnetic fluid 6 decreases upon heating, but the gap a is correspondingly reduced; accordingly, a temperature variation is compensated for, hence, the damping effect is uniformly exerted.

Although the thermal expansion portion 15 of this embodiment is provided in the boss section 2, it may be provided in the mass section 4 or in both sections.

Further, the whole portion of the boss section 2 may be made of the thermal expansion portion 15, for example, the boss section 2 may be made of polycarbonate and the mass section 4 may be made of stainless steel.

Further, the rotary wheel 7 of the sixth embodiment (FIG. 6) may be made of the thermal expansion portion.

In the present invention, since the mass section is supported by the boss section, the gap dimension effective in exerting the damping effect is kept fixed irrespective of an increase/decrease of the viscosity of the magnetic fluid and/or the inertia of the mass section, hence, the damping effect is prevented from becoming nonuniform because the gap dimension is not offset.

Further, since the magnet is used to hold the magnetic fluid exhibiting viscous resistance and to prevent its leakage, no contact-seal means is required, hence, any deviation of the motor stop position from a target point due to the frictional resistance of a contact seal does not occur, and the damping effect is uniformly exerted without any residual oscillations.

Further, since the boss section and the mass section facing each other through the gap are made of materials differing in coefficient of thermal expansion, even if the magnetic fluid is heated by heating of the motor, an external temperature variation and the like so that its viscosity is decreased, such a decrease in viscosity can be canceled out by a change in gap dimension caused by the difference in expansion between the boss section material and the mass section material differing in the coefficient of thermal expansion. Therefore, the damping effect is uniformly exerted without being influenced by thermal fluctuations.

What is claimed is:

1. A damper device for a motor comprising:
   a boss section secured to a rotary shaft of the motor;
   a mass inertia section rotatably and mechanically supported by said boss section, said mass inertia section having a peripheral portion which is spaced from and at least partly surrounds an outer peripheral portion of said boss section to define an annular gap therebetween;
   a magnetic fluid filling up said gap; and
   a pair of axially spaced ring-shaped magnets provided on one of said boss section and said mass inertia section for containing said magnetic fluid in said gap, said pair of magnets being spaced apart a substantial distance by said one of said boss section and said mass inertia section which defines a radially offset area between said magnets containing therein the magnetic fluid.

2. A damper device for a motor as claimed in claim 1 wherein said mass inertia section is supported by a ball bearing secured to said boss section, and said pair of ring-shaped magnets are disposed respectively on opposite sides of the outer peripheral portion of said boss section and facing said peripheral portion of said mass inertia section.

3. A damper device for a motor as claimed in claim 1, wherein said mass inertia section is supported by a ball bearing secured to said boss section, and said pair of ring-shaped magnets are disposed respectively on opposite sides of said peripheral portion of said mass inertia section and facing the outer peripheral portion of said boss section.

4. A damper device for a motor as claimed in claim 1, wherein said mass inertia section has a bearing portion held in direct sliding contact with a bearing portion of said boss section.

5. A damper device for a motor as claimed in claim 1, wherein at least a part of said boss section and at least a part of said mass inertia section which face each other are made of materials having different coefficients of thermal expansion.

6. A damper device for a motor as claimed in claim 5, wherein at least a part of said boss section is made of synthetic resin, and at least a part of said mass inertia section is made of metal.

7. A damper device for damping oscillations of a rotationally driven shaft, comprising: a boss section connectable during use of the damper device to a rotationally driven axially extending shaft so that the boss section is rotationally driven by the shaft; a mass inertia section encircling the boss section, the mass inertia section having an inner peripheral surface portion spaced from and facing an outer peripheral surface portion of the boss section to define therebetween an annular gap; mechanical bearing means rotatably and mechanically supporting the mass inertia section directly on the boss section; a viscous magnetic fluid disposed in the annular gap between the inner and outer peripheral surface portions for imparting a viscous resistance to rotation of the mass inertia section when the boss section is rotationally driven; and a pair of axially spaced ring-shaped magnets carried by one of the boss section and the mass inertia section for confining the magnetic fluid in the annular gap, the pair of magnets being axially separated by a radially extending portion of the aforesaid one of the boss section and the mass inertia section.

8. A damper device according to claim 7; wherein the inner and outer peripheral surface portions have a cylindrical shape; and the mechanical bearing means includes means for maintaining the inner and outer cylindrical surface portions equidistantly spaced apart to thereby maintain the gap spacing generally uniform.

9. A damper device according to claim 8; wherein the mechanical bearing means comprises a roller bearing interposed between the boss section and mass inertia section.

10. A damper device according to claim 8; wherein the mechanical bearing means comprises a bearing surface portion of the boss section in direct sliding contact with a bearing surface portion of the mass inertia section.

11. A damper device according to claim 7; wherein the two ring-shaped magnets are carried by the boss section, one on either side of the annular gap, for confining the magnetic fluid in the annular gap.

12. A damper device according to claim 7; wherein the two ring-shaped magnets are carried by the mass inertia section, one on either side of the annular gap, for confining the magnetic fluid in the annular gap.

13. A damper device according to claim 7; including thermal responsive means responsive to a thermally-induced change in the viscosity of the magnetic fluid for maintaining the damping effect generally constant.

14. A damper device according to claim 13, wherein the thermal responsive means comprises at least a part of the boss section which defines the outer peripheral surface portion being comprised of a material having a different coefficient of thermal expansion than that of the material of at least a part of the mass inertia section which defines the inner peripheral surface portion.

15. A damper device according to claim 14; wherein one of said parts of the boss section and mass inertia section is comprised of synthetic resin and the other of said parts is comprised of metal.

16. A damper device according to claim 7; wherein the boss section has a central portion of larger diameter than the other portions thereof, the outer periphery of the central.

* * * * *